US010888082B2

(12) United States Patent
Nagata

(10) Patent No.: US 10,888,082 B2
(45) Date of Patent: Jan. 12, 2021

(54) AIR BLOWING DEVICE AND INSECT TRAPPING METHOD

(71) Applicant: SHARP KABUSHIKI KAISHA, Sakai (JP)

(72) Inventor: Minoru Nagata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 545 days.

(21) Appl. No.: 15/554,388

(22) PCT Filed: Apr. 20, 2016

(86) PCT No.: PCT/JP2016/062525
§ 371 (c)(1),
(2) Date: Aug. 29, 2017

(87) PCT Pub. No.: WO2016/203840
PCT Pub. Date: Dec. 22, 2016

(65) Prior Publication Data
US 2018/0055033 A1 Mar. 1, 2018

(30) Foreign Application Priority Data

Jun. 18, 2015 (JP) ................................ 2015-123292

(51) Int. Cl.
*A01M 1/06* (2006.01)
*A01M 1/08* (2006.01)
(Continued)

(52) U.S. Cl.
CPC ................ *A01M 1/06* (2013.01); *A01M 1/08* (2013.01); *A01M 1/14* (2013.01); *A01M 1/145* (2013.01); *F24F 7/007* (2013.01); *B01D 46/10* (2013.01)

(58) Field of Classification Search
CPC ............ A01M 1/00; A01M 1/02; A01M 1/06; A01M 1/08; A01M 1/14; A01M 1/10; A01M 1/106
(Continued)

(56) References Cited

U.S. PATENT DOCUMENTS 4,127,961 A * 12/1978 Phillips ................... A01M 1/08
43/113
5,133,788 A 7/1992 Backus
(Continued)

FOREIGN PATENT DOCUMENTS

CA 2511015 A1 12/2005
CA 2511015 C 10/2013
(Continued)

OTHER PUBLICATIONS

Translation of JP 3154622 (Year: 2009).*
International Search Report of International application No. PCT/JP20161062525 and corresponding English translation.

*Primary Examiner* — Darren W Ark
(74) *Attorney, Agent, or Firm* — ScienBiziP, P.C.

(57) ABSTRACT

Provided is an air blowing device that makes it possible to safely improve insect trapping performance. The air blowing device 1 is provided with: a housing 2 comprising an inlet 20 and an outlet 5 for air; an air blower 10 arranged within the housing 2; a pre-filter 8 that is arranged in the inlet 20 and that collects dust within air; and a cover member 3 that comprises an air suction port 4, that is attached to the housing 2, and that forms an insect trap space 25 between the suction port 4 and the inlet 20. Insects that enter the insect trap space 25 via the suction port 4 are trapped. The outer surface of the cover member 3 is formed so as to have a dark color.

5 Claims, 9 Drawing Sheets

US 10,888,082 B2
Page 2

(51) Int. Cl.
*A01M 1/14* (2006.01)
*F24F 7/007* (2006.01)
*B01D 46/10* (2006.01)

(58) Field of Classification Search
USPC .................................. 43/139, 107, 114, 113
See application file for complete search history.

(56) References Cited

U.S. PATENT DOCUMENTS

| | | | | |
|---|---|---|---|---|
| 7,191,560 | B2 * | 3/2007 | Harris | A01M 1/02 |
| | | | | 43/107 |
| 7,774,976 | B2 * | 8/2010 | Geier | A01M 1/026 |
| | | | | 43/139 |
| 7,937,887 | B2 * | 5/2011 | Child | A01M 1/023 |
| | | | | 43/113 |
| 8,402,691 | B2 * | 3/2013 | Coventry | A01M 1/06 |
| | | | | 43/139 |
| 9,883,666 | B1 * | 2/2018 | Conklin | A01M 1/04 |
| 10,091,980 | B1 * | 10/2018 | Cogley | A01M 1/023 |
| 10,091,981 | B1 * | 10/2018 | Cogley | A01M 1/223 |
| 10,458,437 | B2 * | 10/2019 | Shigemoto | B01J 21/063 |
| 10,602,731 | B2 * | 3/2020 | Nagata | A01M 1/08 |
| 2004/0128904 | A1 * | 7/2004 | Chen | A01M 1/08 |
| | | | | 43/139 |
| 2006/0218851 | A1 * | 10/2006 | Weiss | A01M 1/08 |
| | | | | 43/113 |
| 2007/0011940 | A1 * | 1/2007 | Chen | A01M 1/023 |
| | | | | 43/113 |
| 2007/0056208 | A1 * | 3/2007 | Chen | A01M 1/08 |
| | | | | 43/113 |
| 2007/0256351 | A1 * | 11/2007 | Milton | A01M 1/08 |
| | | | | 43/139 |
| 2011/0041384 | A1 | 2/2011 | Willcox et al. | |
| 2011/0283597 | A1 * | 11/2011 | Coventry | A01M 1/08 |
| | | | | 43/107 |
| 2015/0201603 | A1 | 7/2015 | Willcox et al. | |
| 2018/0199562 | A1 | 7/2018 | Willcox et al. | |
| 2018/0368383 | A1 * | 12/2018 | Ko | A01M 1/023 |

FOREIGN PATENT DOCUMENTS

| | | | | | |
|---|---|---|---|---|---|
| CN | 102014615 | A | | 4/2011 | |
| JP | 2005058050 | A | * | 3/2005 | |
| JP | 2006-230258 | A | | 9/2006 | |
| JP | 2006230258 | A | * | 9/2006 | |
| JP | 2009-66466 | A | | 4/2009 | |
| JP | 2009066466 | A | * | 4/2009 | |
| JP | 3154622 | U | | 10/2009 | |
| JP | 3154622 | U | * | 10/2009 | |
| JP | 2011-005687 | A | | 1/2011 | |
| JP | 2011005687 | A | * | 1/2011 | |
| JP | 2016208935 | A | * | 12/2016 | ........... F04D 29/703 |
| JP | 2017140045 | A | * | 8/2017 | ........... F04D 29/703 |
| JP | 2017216971 | A | * | 12/2017 | |
| JP | 2017217981 | A | * | 12/2017 | |
| JP | 2018000125 | A | * | 1/2018 | |
| JP | 2018004212 | A | * | 1/2018 | |
| JP | 2018033449 | A | * | 3/2018 | |
| JP | 2018096612 | A | * | 6/2018 | |
| JP | 2018096634 | A | * | 6/2018 | |
| JP | 2018174939 | A | * | 11/2018 | ........... F04D 29/703 |
| KR | 20120073476 | A | * | 7/2012 | |
| TW | 200618735 | A | | 6/2006 | |
| TW | 384534 | U | * | 7/2010 | |
| TW | M384534 | U1 | | 7/2010 | |
| WO | WO-2018236147 | A1 | * | 12/2018 | ............. A01M 1/08 |

* cited by examiner

AIR BLOWING DEVICE AND INSECT TRAPPING METHOD

TECHNICAL FIELD

The present invention relates to an air blowing device that traps insects that have entered an insect trapping space between a housing and a cover member and to an insect trapping method.

BACKGROUND ART

Patent Document 1 discloses a conventional air blowing device. This air blowing device has a housing that has an opening as an air inflow port formed through a back surface thereof and an opening as an air blow-off port formed through an upper surface thereof. The housing is installed on a floor surface or the like in a room and includes an air blower therein. A filter that collects dust in air is arranged at the inflow port. On a back surface side of the housing, a cover member that covers the inflow port is demountably mounted with respect to the housing. The cover member has a plurality of openings each formed therethrough as an air section port.

In the air blowing device configured as above, upon a start of an operation, the air blower is driven to cause air to be sucked in through the suction port. The air thus sucked in through the suction port flows into the inflow port, and after dust is collected therefrom by the filter, the air is discharged to the exterior through the blow-off port. Thus, air in the room can be purified. Furthermore, cleaning of the filter is enabled by demounting the cover member from the housing.

According to the air blowing device of Patent Document 1 described above, dust in air is collected, and thus health hazards caused by dust or the like can be reduced. Furthermore, with a recent increase in health awareness, there is a growing demand for an air blowing device having an insect trapping function in order to reduce infectious diseases or the like transmitted by insects such as a mosquito.

An insect trapping device described in Patent Document 2 is provided with a housing having a front surface that is opened/closed with a door and a side surface that has an opening portion formed therethrough, an attraction light source that emits attraction light for attracting insects into the housing, and an adhesive insect trapping sheet that is arranged on a back surface of the door and traps insects.

In the insect trapping device configured as above, when the attraction light source is lit with the door closed, attraction light is emitted toward the exterior of the housing via the opening portion of the side surface. An insect enters the housing via the opening portion of the side surface and gets caught by the insect trapping sheet. Then, the insect trapping sheet thus used, to which a predetermined quantity of insects have adhered, is removed from the door, and an unused insect trapping sheet is attached to a predetermined position on the door. Thus, replacement of an insect trapping sheet can be performed.

LIST OF CITATIONS

Patent Literature

Patent Document 1: JP-A-2009-66466 (see pages 8 and 9 and FIGS. 1 and 2)
Patent Document 2: JP-A-2006-230258 (see pages 5 and 6 and FIGS. 1, 2, and 4)

SUMMARY OF THE INVENTION

Technical Problem

According to the insect trapping device of Patent Document 2 described above, however, attraction light does not reach to a sufficient distance in a direction not facing the opening portion of the side surface, and thus there has been a problem that insect trapping performance is decreased. Meanwhile, mounting the attraction light source to an outer surface of the insect trapping device leads to a fear that attraction light might exert an adverse effect on a user's eyes.

An object of the present invention is to provide an air blowing device capable of safely improving insect trapping performance. Furthermore, another object of the present invention is to provide an insect trapping method capable of safely improving an insect trapping effect.

Solution to the Problem

In order to achieve the above-described objects, the present invention is characterized as follows. That is, an air blowing device is provided with a housing that has openings as an air inflow port and an air blow-off port, an air blower that is arranged in the housing, a filter that is arranged at the inflow port and collects dust in air, and a cover member that has an opening as an air suction port, is mounted to the housing, and forms an insect trapping space between the suction port and the inflow port, and the air blowing device is configured to tap insects that have entered the insect trapping space via the suction port. In the air blowing device, an outer surface of the cover member is formed in a dark color.

According to this configuration, the air blower is driven to cause air to be sucked in through the suction port, and dust in the air is collected by the filter, after which the air is discharged through the blow-off port. An insect is attracted to the cover member whose outer surface is formed in a dark color and enters the insect trapping space via the suction port provided through the cover member, thus being trapped.

Furthermore, in the present invention, preferably, in the air blowing device configured as above, a region of the housing, which faces the insect trapping space, is colored in a dark color.

Furthermore, in the present invention, preferably, in the air blowing device configured as above, the cover member is arranged behind the housing, and a front surface of the housing is formed in a bright color.

Furthermore, in the present invention, preferably, in the air blowing device configured as above, the cover member is formed so as to be mountable/demountable to/from the housing, and an insect trapping sheet that is formed of a base material sheet with an adhesive applied on one surface thereof is provided. Further, the insect trapping sheet is disposed on an inner surface of the cover member so as to be opposed to the filter.

Furthermore, in the present invention, preferably, in the air blowing device configured as above, the insect trapping sheet is formed in a dark color.

Furthermore, in the present invention, preferably, in the air blowing device configured as above, an attraction light source is provided that emits light for attracting insects to the insect trapping space, and the insect trapping sheet is arranged to extend between an upper portion and a lower portion of the insect trapping space. Further, the inflow port is disposed to face the lower portion of the insect trapping space, and the attraction light source is disposed to face the upper portion of the insect trapping space.

Furthermore, in the present invention, preferably, in the air blowing device configured as above, an impeller that is mounted to a rotary shaft of a motor of the air blower is arranged to face the inflow port, and the insect trapping sheet is projected in an axial direction of the motor so as to cover the motor in its entirety.

Furthermore, in the present invention, preferably, in the air blowing device configured as above, when an opening area of the suction port is indicated as A m$^3$ and an air volume of the air blower is indicated as Q m$^3$/s, Q/A>0.7 is satisfied.

Furthermore, the present invention is characterized as follows. That is, an insect trapping method is such that there are provided a housing that has openings as an air inflow port and an air blow-off port, an air blower that is arranged in the housing, a filter that is arranged at the inflow port and collects dust in air, and a cover member that has an opening as an air suction port, is mounted to the housing, and forms an insect trapping space between the suction port and the inflow port, and the air blower is driven to trap insects that have entered the insect trapping space via the suction port. In the insect trapping method, an outer surface of the cover member is formed in a dark color.

Advantageous Effects of the Invention

According to the air blowing device of the present invention, the cover member has an opening as the suction port, is mounted to the housing, and forms the insect trapping space between the suction port and the inflow port of the housing, and the outer surface of the cover member is formed in a dark color. By this configuration, an adverse effect on a user's eyes is reduced, and insects can be easily attracted to the insect trapping space. Thus, insect trapping performance of the air blowing device can be safely improved.

Furthermore, according to the insect trapping method of the present invention, the cover member has an opening as the suction port, is mounted to the housing, and forms the insect trapping space between the suction port and the inflow port of the housing, and the outer surface of the cover member is formed in a dark color. By this configuration, an adverse effect on a user's eyes is reduced, and insects can be easily attracted to the insect trapping space. Thus, an insect trapping effect can be easily improved.

DESCRIPTION OF EMBODIMENTS

First Embodiment

Figure 1:
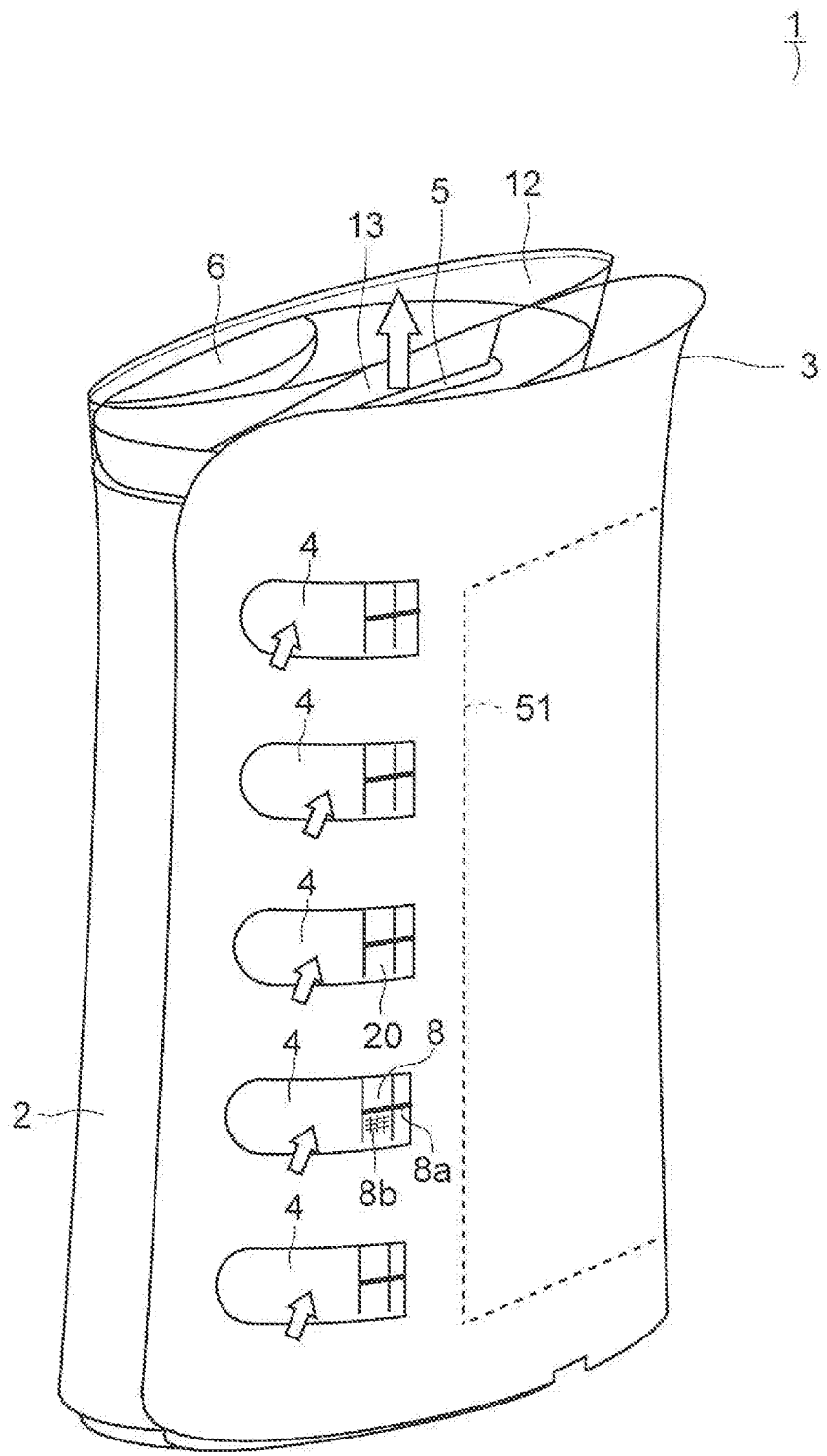
FIG. 1 is a perspective view showing an air blowing device of a first embodiment of the present invention.
Figure 2:
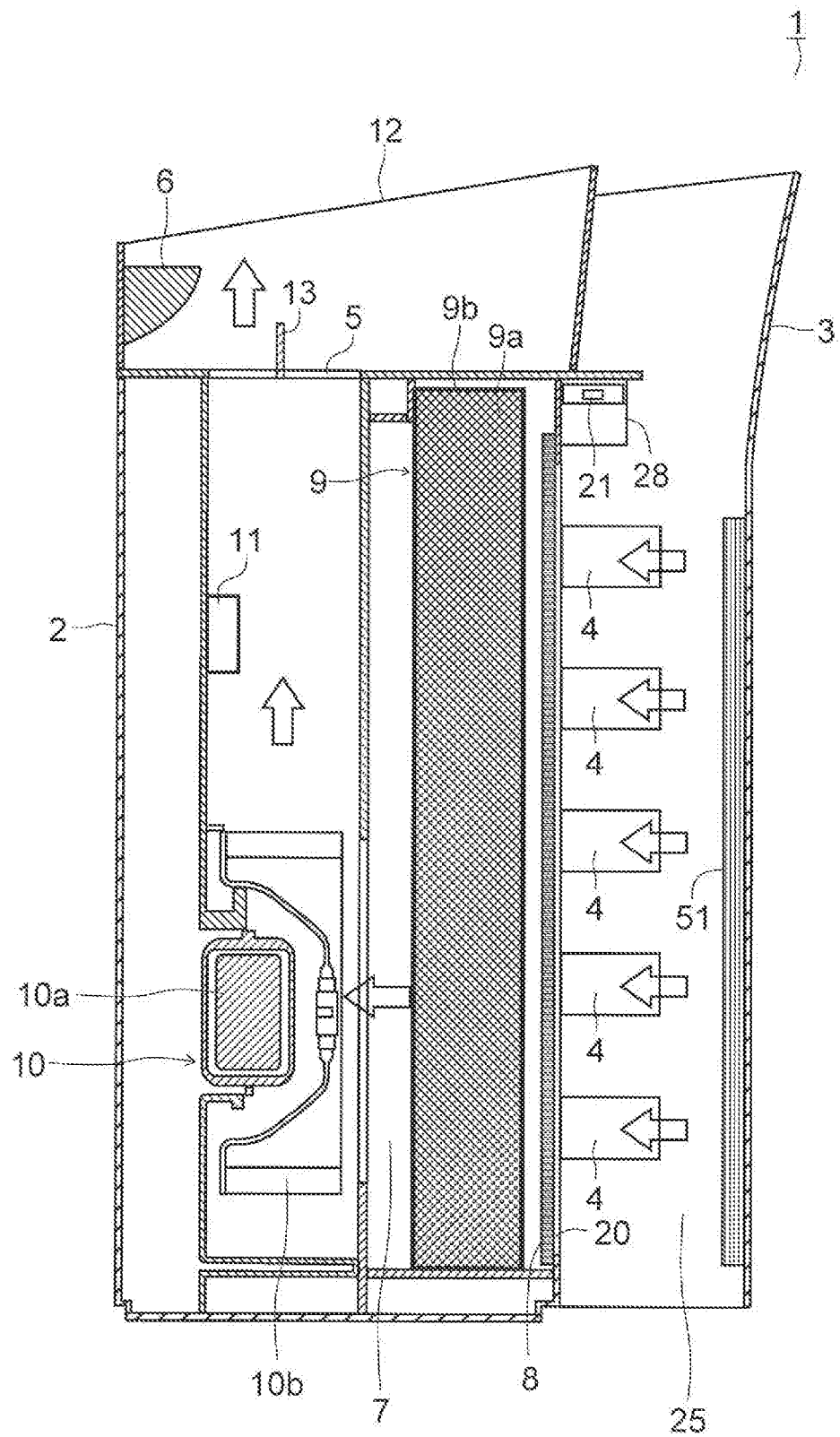
FIG. 2 is a side sectional view showing the air blowing device of the first embodiment of the present invention.

With reference to the appended drawings, the following describes an embodiment of the present invention. FIG. 1 shows a perspective view of an air blowing device of a first embodiment, and FIG. 2 shows a side sectional view thereof. In FIG. 1 and FIG. 2, each hollow arrow indicates an airflow. An air blowing device 1 is installed on a floor surface or the like in a room and has a housing 2 whose horizontal sectional shape is substantially elliptical. A demountable cover member 3 is mounted on a back surface side of the housing 2, and an insect trapping sheet 51, which will be detailed later, is arranged on an inner surface of the cover member 3. A front surface of the housing 2, a back surface of the housing 2, and an outer surface of the cover member 3 are formed in black.

A sleeve portion 12 made of a transparent resin is provided in a circumferential edge portion of an upper surface of the housing 2. An operation portion 6 is provided in a front portion of the upper surface of the housing 2. The operation portion 6 has a plurality of buttons (not shown) and is operated by a user to perform operation setting for the air blowing device 1. By operating the buttons, it is possible to issue instructions about driving on/off of the air blowing device 1, changing of an air volume of an after-mentioned air blower 10, on/off of an after-mentioned ion generator 11, and so on.

An inflow port 20 is open through the back surface of the housing 2, and a blow-off port 5 is open through the upper surface of the housing 2. A protruding plate 13 that protrudes upward is provided in a center portion of the blow-off port 5. The cover member 3 has a plurality of suction ports 4 formed therethrough, and an insect trapping space 25 that allows the suction ports 4 and the inflow port 20 to communicate with each other is formed between the cover member 3 and the back surface of the housing 2.

In the housing 2, an air blowing passage 7 is provided that links the inflow port 20 to the blow-off port 5. In the air blowing passage 7, in order from the inflow port 20 toward the blow-off port 5 (from upstream toward downstream of an airflow), a pre-filter 8, a HEPA filter 9, the air blower 10, and the ion generator 11 are provided.

The air blower 10 is formed of a centrifugal fan arranged in a lower portion of the housing 2 and having a motor 10a and an impeller 10b mounted to a rotary shaft of the motor 10a. The impeller 10b is arranged to face the inflow port 20. The air blower 10 sucks in air in an axial direction and exhausts the air in a circumferential direction. With the air blower 10 disposed in the lower portion of the housing 2, without the need to increase a length of the housing 2 in an up-down direction, a flow passage area of an airflow discharged from the air blower 10 can be gradually increased. By operating the operation portion 6, the air blower 10 is made to vary among a plurality of air blowing levels, which are "Very Low", "Low", "Medium", and "High". The air blower 10 increases in rotational speed in the order of "Very Low", "Low", "Medium", and "High". The air blower 10 may also be formed of an axial flow fan.

The pre-filter 8 is formed by welding a polypropylene mesh 8b to a rectangular frame 8a that is made of a synthetic resin such as ABS and has a plurality of columns and rows of windows. The mesh 8b is formed to have such a mesh size that an insect such as a mosquito or a fly cannot pass therethrough. Large-sized particles of dust in the air can be collected by the pre-filter 8.

The HEPA filter 9 is formed by welding a frame member 9b to a filter medium 9a so as to cover the filter medium 9a by a hot melt process. Fine particles of dust in the air including a microparticulate substance, such as PM 2.5, can be collected by the HEPA filter 9.

A deodorization filter having an absorbent material such as activated carbon may be disposed between the pre-filter 8 and the HEPA filter 9. With this configuration, odor components in the air are absorbed, so that the air can be deodorized.

The ion generator 11 has an electrode (not shown) that generates ions upon application of a high voltage thereto, and the electrode faces an interior of the air blowing passage 7. A voltage having an alternating waveform or an impulse waveform applied to the electrode. In a case where a positive voltage applied to the electrode, the electrode mainly generates positive ions $H^+(H_2O)m$, and in a case where a negative voltage is applied to the electrode, the electrode mainly generates negative ions $O_2^-(H_2O)n$. Here, m and n are integers $H^+(H_2O)m$ and $O_2^-(H_2)n$ aggregate on surfaces of airborne bacteria or odor components in the air and surround the airborne bacteria or the odor components.

Then, as shown in formulae (1) to (3), on surfaces of microorganisms or the like, an aggregate of [.OH](hydroxyl radical) and $H_2O_2$ (hydrogen peroxide) that are active species is produced by collision, which destroys the airborne bacteria and so on. Here, m' and n' are integers. Accordingly, bacteria eradication and odor removal in a room can be performed by generating positive ions and negative ions and discharging them through the blow-off port 5.

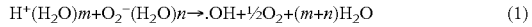

$$H^+(H_2O)m+O_2^-(H_2O)n \rightarrow .OH+\tfrac{1}{2}O_2+(m+n)H_2O \qquad (1)$$

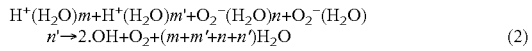

$$H^+(H_2O)m+H^+(H_2O)m'+O_2^-(H_2O)n+O_2^-(H_2O)n' \rightarrow 2.OH+O_2+(m+m'+n+n')H_2O \qquad (2)$$

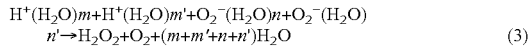

$$H^+(H_2O)m+H^+(H_2O)m'+O_2^-(H_2O)n+O_2^-(H_2O)n' \rightarrow H_2O_2+O_2+(m+m'+n+n')H_2O \qquad (3)$$

Figure 3:
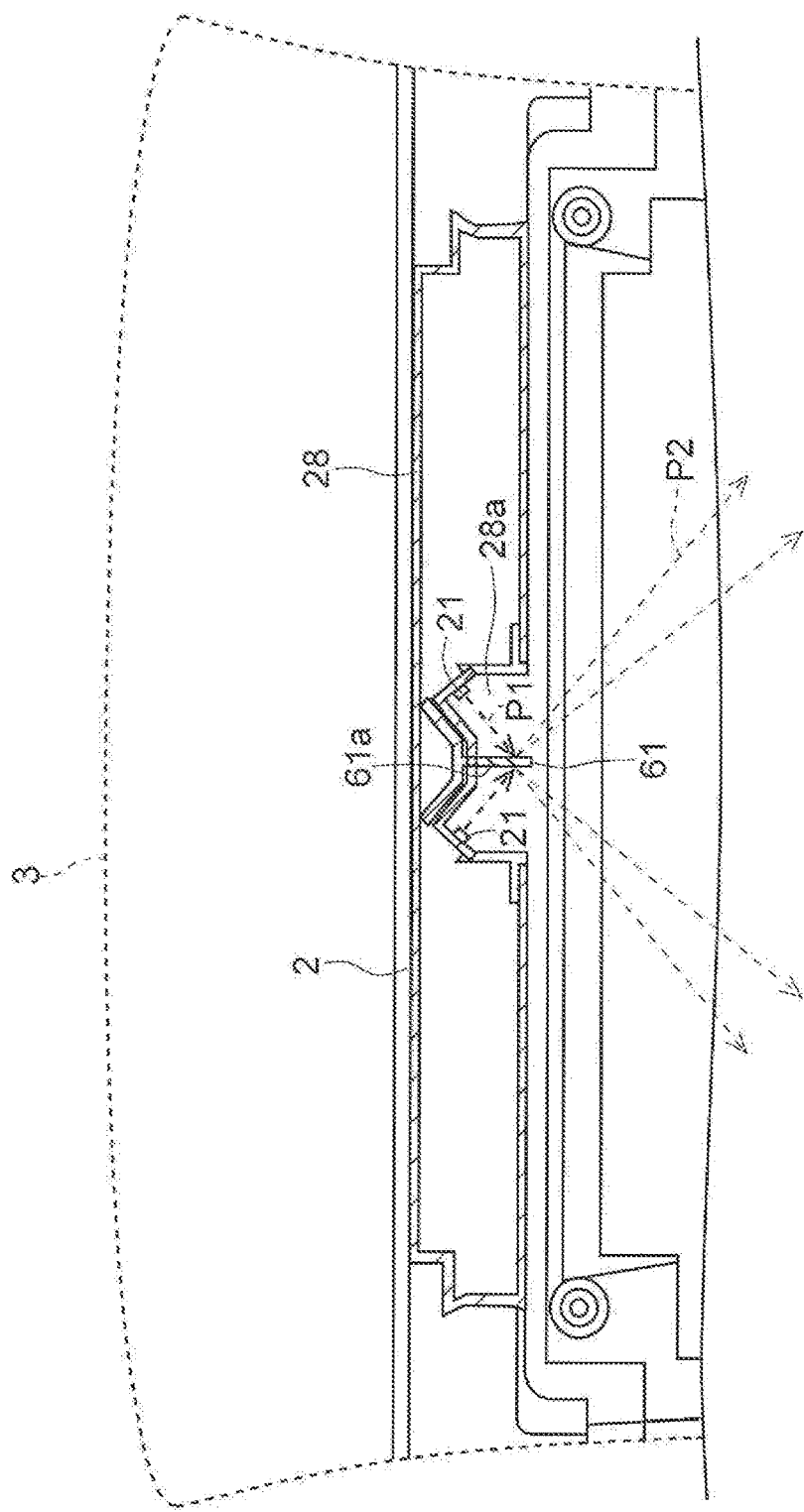
FIG. 3 is a back sectional view showing the air blowing device of the first embodiment of the present invention.

FIG. 3 shows a back sectional view of an upper portion of the housing 2 of the air blowing device 1. In an upper portion of the back surface of the housing 2, a protruding portion 28 is provided that protrudes outward (to a cover member 3 side) with respect to the inflow port 20. The protruding portion 28 is formed to extend in a left-right direction, and a concave portion 28a is formed by concaving a middle portion of a lower surface of the protruding portion 28 in the left-right direction.

An attraction light source 21 is arranged at each of left and right end portions in the concave portion 28a so that a light emission surface (not shown) thereof faces diagonally downward. Thus, the attraction light source 21 is disposed above the suction ports 4 of the cover member 3 so as to face an upper portion of the insect trapping space 25. The attraction light source 21 has an ultraviolet light emitting diode (not shown) that emits ultraviolet light of about 365 nm, which attracts insects such as a mosquito.

In a middle portion of the concur portion 28a in the left-right direction, a plate-shaped reflection portion 61 having a reflection surface 61a formed on each of both surfaces thereof is provided in a hanging manner. The reflection surface 61a is grained, and light P1 emitted from the light emission surface of the attraction light source 21 is diffused and reflected on the reflection surface 61a. Light P2 diffused and reflected on the reflection surface 61a travels toward the suction ports 4. This can prevent a user from directly seeing the attraction light source 21. The attraction light source 21 and the reflection portion 61 may be provided, instead of in the housing 2, on the inner surface of the cover member 3, or in the housing 2 and the cover member 3.

Figure 4:
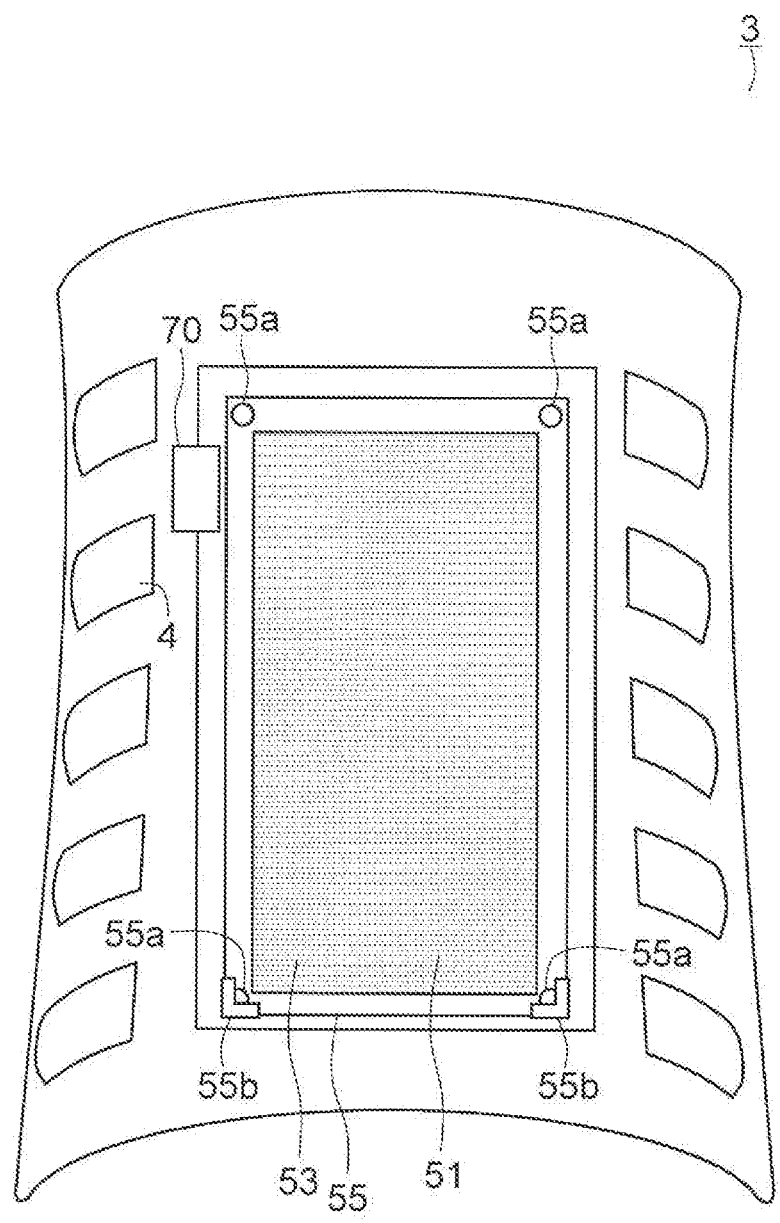
FIG. 4 is a perspective view showing a cover member of the air blowing device of the first embodiment of the present invention.

FIG. 4 shows a perspective view of the cover member 3 as seen from an inner side (a housing 2 side). The cover member 3 has an engagement piece (not shown) that is engaged with an engagement hole (not shown) provided through the housing 2. Thus, the cover member 3 is demountably mounted with respect to the housing 2. The cover member 3 is bent so as to be convex rearward, and a plurality of (in this embodiment, five) suction ports 4 are juxtaposed vertically in each of both left and right end portions of the cover member 3. Instead, a single suction port 4 may also be provided.

Figure 5:
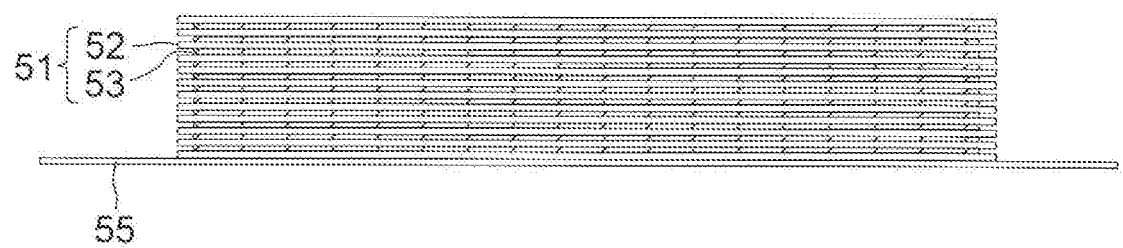
FIG. 5 is a side view showing art insect trapping sheet of the air blowing device of the first embodiment of the present invention.

FIG. 5 shows a side view of the insect trapping sheet 51. A plurality of insect trapping sheets 51 each formed of a base material sheet 52 with an adhesive 53 applied on one surface thereof are stacked via a release agent (not shown) such as silicone, and a laminate thus obtained is bonded onto a mounting plate 55. The insect trapping sheets 51 and the mounting plate 55 are formed in black. The base material sheet 52 is formed of, for example, a sheet of paper, a resin film, or the like. The adhesive 53 is not particularly limited and, for example, an acrylic-based adhesive or the like can be used as the adhesive 53.

Figure 6:
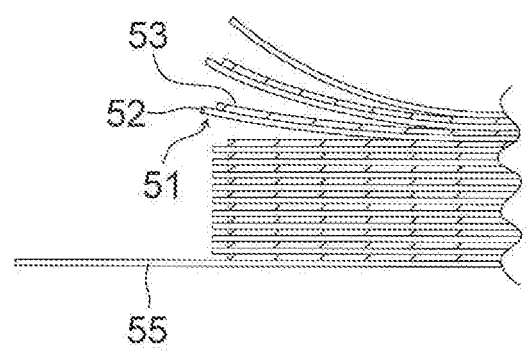
FIG. 6 is a side view showing the insect trapping sheet of the air blowing device of the first embodiment of the present invention in a state where the insect trapping sheet is peeled off.

FIG. 6 shows a side view of the insect trapping sheets 51 in a state where one of the insect trapping sheets 51 is peeled off. The insect trapping sheets 51 are stacked via the release agent, and thus a used one of the insect trapping sheets 51, to which insects have adhered to the adhesive 53, is peeled off. Thus, an unused one of the insect trapping sheets 51 is exposed.

The adhesive 53 of each of the insect trapping sheets 51 may be water-soluble. Examples of materials of a water-soluble adhesive include dextrin, polyvinyl alcohol, polyvinyl pyrrolidone, starch, and gum arabic. With this configuration, the cover member 3 is demounted from the housing 2, and a surface of the adhesive 53 to which insects, dust, and so on have adhered can be washed off with water or the like. Accordingly, a frequency of replacing the insect trapping sheet 51 can be decreased.

As shown in FIG. 4, engagement holes 55a are provided at four corners of the mounting plate 55, respectively. In an upper portion of the inner surface of the cover member 3, a pair of left and right hook-shaped engagement pieces (not shown) that protrude toward the housing 2 are provided. In a lower portion of the inner surface of the cover member 3, a pair of left and right support portions 55b are provided, each of which is L-shaped in front view and has a groove (not shown) for inserting the mounting plate 55 thereinto.

Corresponding ones of the engagement holes 55a of the mounting plate 55 are engaged with the engagement pieces of the cover member 3, respectively, and left and right end portions of a lower end portion of the mounting plate 55 are placed in the support portions 55b, respectively, so that the insect trapping sheets 51 are removably arranged on the inner surface of the cover member 3, extending between the upper portion and the lower portion of the insect trapping space 25. At this time, the insect trapping sheets 51 are opposed to the pre-filter 8. Furthermore, the engagement holes 55a are provided on upper and lower sides, and thus the insect trapping sheets 51 can be mounted so as to be able to be inverted in an up-down direction. This allows an entire surface of each of the insect trapping sheets 51 to be used effectively. Accordingly, a frequency of replacing the insect trapping sheet 51 can be decreased, and thus convenience can be improved.

Figure 7:
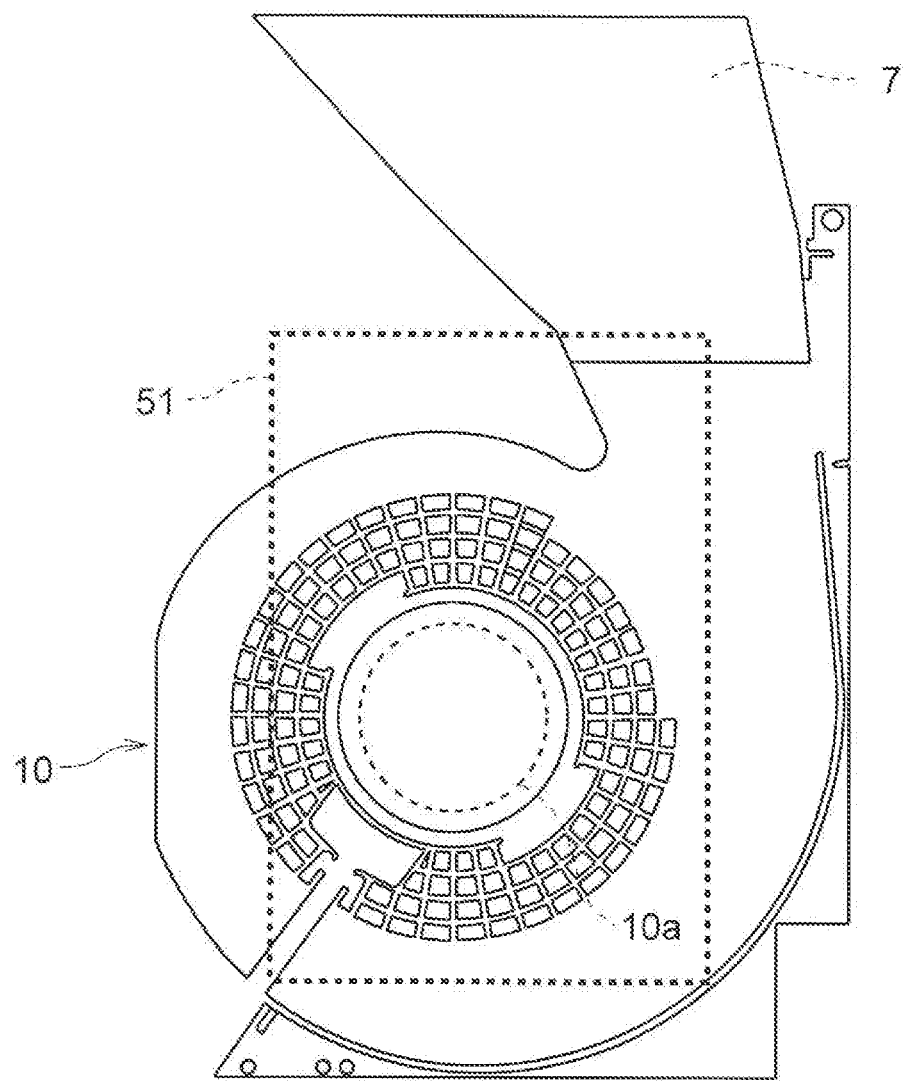
FIG. 7 is a view for explaining a positional relationship between an air blower and the insect trapping sheet inside the air blowing device of the first embodiment of the present invention.

FIG. 7 shows a back view for explaining a positional relationship between the air blower 10 and the insect trapping sheet 51. The insect trapping sheet 51 is disposed on the inner surface of the cover member 3 so as to be opposed to the lower portion of the housing 2, and is projected in an axial direction (a direction orthogonal to a paper plane) of the motor 10a of the air blower 10 so as to cover the motor 10 in its entirety. The insect trapping sheet 51 may also be projected in the axial direction of the motor 10a so as to cover the motor 10a and the inflow port 20 (the impeller 10b) in their entirety.

Furthermore, as shown in FIG. 4, an odor generation portion 70 that generates an insect-attracting odor substance is provided on the inner surface of the cover member 3. The odor substance is not particularly limited, and examples thereof include lactic acid. Lactic acid can easily attract insects such as a mosquito to the insect trapping space 25. An installation location of the odor generation portion 70 is not limited to the inner surface of the cover member 3, and as long as the installation location is within the insect trapping space 25, the odor generation portion 70 may be provided on the back surface of the housing 2.

A configuration may also be adopted in which the base material sheet 52 of each of the insect trapping sheets 51 contains an odor substance, thus forming an odor generation portion. Furthermore, a configuration may also be adopted in which the adhesive 53 and an odor substance are applied adjacently to each other in a staggered pattern or a striped pattern on the base material sheet 52, thus forming an odor generation portion. Furthermore, a configuration may also be adopted in which the adhesive 53 of each of the insect trapping sheets 51 contains an odor substance, thus forming an odor generation portion. That is, an odor generation portion may be formed by providing an odor substance in each of the insect trapping sheets 51. Furthermore, an odor generation portion may be formed by applying an odor substance on the mounting plate 55.

In the air blowing device 1 configured as above, when the operation portion 6 is operated to instruct an operation of the air blowing device 1, the air blower 10 is driven, and the attraction light source 21 is lit. The driving of the air bower 10 causes air in a room to flow into the insect trapping space 25 via the suction ports 4. By the reflection surface 61a emission light from the attraction light source 21 is diffused and reflected toward the suction ports 4. Thus, insects can be attracted to the insect trapping space 25 via the suction ports 4. Furthermore, this prevents a user from directly seeing the attraction light source 21 and thus can reduce an influence of ultraviolet light of the attraction light source 21 on the user's health.

Insects such as a mosquito are known to be fond of a black color. In this embodiment, the outer surface of the cover member 3 is formed in black, and thus an insect found in a region in a room, which is hardly reached by emission light from the attraction light source 21, can be easily attracted to a vicinity of the cover member 3. Furthermore, the back surface of the housing 2 (a region facing the insect trapping space 25) is formed in black, and thus the insect attracted to the vicinity of the cover member 3 can be easily attracted to the insect trapping space 25 via the suction ports 4. Furthermore, the insect trapping sheet 51 is termed in black, and thus the insect that has entered the insect trapping space 25 is easily attracted to and trapped by the insect trapping sheet 51.

At this time, the insect trapping sheet 51 is disposed on the inner surface of the cover member 3 so as to be opposed to the pre-filter 8. Thus, when an insect that has entered through the suction ports 4 is carried by a sucked-in airflow toward the inflow port 20, the insect is trapped by the insect trapping sheet 51 opposed to the inflow port 20. Thus, clogging of the pre-filter 8 with insects can be reduced. Furthermore, adherence of dust in the sucked-in airflow to the insect trapping sheet 5 can be reduced.

Furthermore, the insect trapping sheet 51 is arranged to extend between the upper portion and the lower portion of the insect trapping space 25, the inflow port 20 is disposed to face the lower portion of the insect trapping space 25, and the attraction light source 21 is disposed to face the upper portion of the insect trapping space 25. This makes it easier for an insect being attracted to the attraction light source 21 to enter the insect trapping space 25 through upper ones of the suction ports 4. An insect carried by a sucked-in airflow toward the inflow port 20 facing the lower portion of the insect trapping space 25 is likely to be trapped at a lower portion of the insect trapping sheet 51. With this in view, a quantity of insects trapped at an upper portion of the insect trapping sheet 51 is increased by operating the attraction light source 21, and thus insects can be uniformly trapped over the entire insect trapping sheet 51. Accordingly, a frequency of replacing the insect trapping sheet 51 is reduced, and thus convenience can be improved.

Furthermore, the insect trapping sheet 51 is projected in the axial direction of the motor 10a so as to cover the motor 10a in its entirety. Thus, an airflow sucked into the inflow port 20 by the air blower 10 can be made to circulate in a wide range along the insect trapping sheet 51. This makes it likely that an insect carried by the sucked-in airflow comes in contact with the insect trapping sheet 51, and thus a quantity of insects trapped by the insect trapping sheet 51 can be increased.

Air that has flowed into the insect trapping space 25 flows through the inflow port 20 of the housing 2 into the air blowing passage 7. At this time, large-sized particles of dust in the air are collected by the pre-filter 8. Furthermore, fine particles of dust in the air including PM 2.5 or the like are collected by the HEPA filter 9. Air flowing through the air blowing passage 7 on an exhaust side of the air blower 10 contains ions generated by the ion generator 11. The ion-containing air from which dust has been collected is discharged through the blow-off port 5. Thus, air in a room can be purified.

When the air blowing device 1 is in use, insects adhere to the adhesive 53 of an exposed one of the insect trapping sheets 51. In this case, when a user demounts the cover member 3 from the housing 2 and peels off the used one of the insect trapping sheets 51, to which the insects have adhered, an unused one of the insect trapping sheets 51 is exposed. This saves the trouble of replacing the insect trapping sheet 51 and thus can improve convenience of the air blowing device 1.

Figure 8:
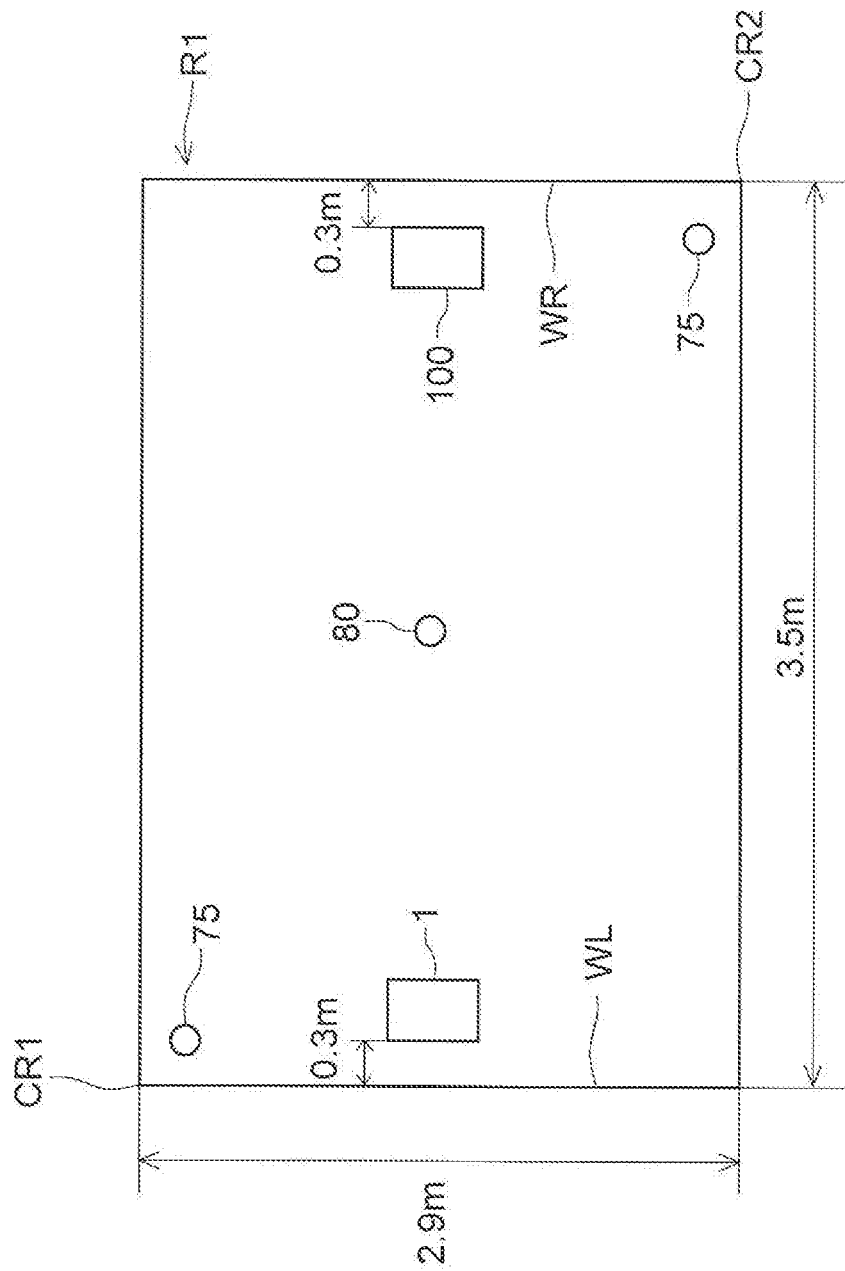
FIG. 8 is a plan view for explaining an experiment for examining a trapping rate of the air blowing device of the first embodiment of the present invention with respect to various types of mosquitoes.

Tables 1 to 3 show results of trapping rates of the air blowing device 1 with respect to *Culex pipiens pallens*, *Culex pipiens molestus*, and *Aedes albopictus*, respectively. FIG. 8 shows a plan view of a test room R1 for explaining an experiment for examining a trapping rate of the air blowing device 1.

In the test room R1 (corresponding to a six-mat room) that was 3.5 m in length in a width direction, 2.9 m in length in a depth direction, and 2.2 m in length in a height direction, the air blowing device 1 was disposed at a position 0.3 m away from a left side wall WL. In the air blowing device 1, the front surface of the housing 2, the back surface of the housing 2, and the outer surface of the cover member 3 were formed in black. As a hiding place for test insects, a rest box 100 formed of a black corrugated cardboard carton was used. In the rest box 100, there were provided an equal number of opening portions (not shown) to the number of the suction ports 4 in the air blowing device 1, each of which has an opening area substantially equal to that of each of the suction ports 4. The rest box 100 was disposed at a position 0.3 m away from a right side wall WR. In the rest box 100, no insect trapping sheets 51 are provided.

A cup 75 was disposed in a vicinity of each of diagonally positioned corner portions CR1 and CR2 in the test room R1. A piece of absorbent cotton impregnated with a bait for mosquitoes (a sugar solution having a sugar content of 3%) was put in the cup 75. Furthermore, in a center portion in the test room R1, a cage 80 containing test insects was disposed.

As the test insects, female images of *Culex pipiens pallens*, *Culex pipiens molestus*, and *Aedes albopictus* were used.

The experiment was started by opening the cage 80 to release the test insects into the test room R1. At this time, the attraction light source 21 of the air blowing device 1 was lit, and the air blower 10 was driven at an air blowing level "Medium". After a lapse of 22 hours (an experiment time) following the release of the test insects, the air blower 10 and the attraction light source 21 of the air blowing device 1 were stopped from operating, and the number of insects trapped by the insect trapping sheet 51 of the air blowing device 1, the number of insects trapped in any other section than on the insect trapping sheet 51 in the air blowing device 1, the number of insects in the test room R1 outside the air blowing device 1, and the number of dead insects were counted. This experiment was implemented three times with respect to each of these types of test insects.

The test room R1 was kept well illuminated for 14 hours out of the experiment time and kept dark for remaining eight hours. Furthermore, a floor surface in the test room R1 was maintained at a temperature not lower than 25° C.

A trapping rate T (%) was calculated using Expression (1), where the number of insects trapped (the number of insects contained, in the air blowing device 1) was indicated as Nc, and the number of insects collected from the entire test room R1 was indicated as Nr. The numbers of insects Nc and Nr also include the number of dead insects. Furthermore, based on a total of the numbers of insects as the of the experiment performed three times, the trapping rate T was calculated. The number of test insects released into the test room R1 is assumed to be the number of test insects.

$$T = 100 \times Nc/Nr \qquad (1)$$

TABLE 1

| | No. of Test Insects | No. of Insects Collected | Entire Device | Insect Trapping Sheet | Other than Insect Trapping Sheet (No. of Dead Insects Included) | No. of Insects Outside Device (No. of Dead Insects Included) |
|---|---|---|---|---|---|---|
| | | No. of *Culex pipiens pallens* Trapped | | | | |
| 1st Time | 216 | 212 | 198 | 192 | 6 (3) | 14 (11) |
| 2nd Time | 209 | 209 | 204 | 195 | 9 (9) | 5 (5) |
| 3rd Time | 200 | 197 | 186 | 172 | 14 (13) | 11 (7) |
| Total Trapping Rate (%) | 625 | 618 (Collection Rate: 98.9%) | 588 95.1 | 559 90.5 | 29 (25) 4.7 | 30 (23) |

TABLE 2

| | No. of Test Insects | No. of Insects Collected | Entire Device | Insect Trapping Sheet | Other than Insect Trapping Sheet (No. of Dead Insects Included) | No. of Insects Outside Device (No. of Dead Insects Included) |
|---|---|---|---|---|---|---|
| | | No. of *Culex pipiens molestus* Trapped | | | | |
| 1st Time | 212 | 212 | 205 | 160 | 45 (4) | 7 (0) |
| 2nd Time | 218 | 216 | 215 | 183 | 32 (31) | 1 (1) |
| 3rd Time | 197 | 197 | 195 | 176 | 19 (19) | 2 (1) |
| Total Trapping Rate (%) | 627 | 625 (Collection Rate: 99.7%) | 615 98.4 | 519 83.0 | 96 (54) 15.4 | 10 (2) |

TABLE 3

| | | No. of *Aedes albopictus* Trapped | | | |
|---|---|---|---|---|---|
| | No. of Test Insects | No. of Insects Collected | Entire Device | Insect Trapping Sheet | Other than Insect Trapping Sheet (No. of Dead Insects Included) | No. of Insects Outside Device (No. of Dead Insects Included) |

| | No. of Test Insects | No. of Insects Collected | Entire Device | Insect Trapping Sheet | Other than Insect Trapping Sheet (No. of Dead Insects Included) | No. of Insects Outside Device (No. of Dead Insects Included) |
|---|---|---|---|---|---|---|
| 1st Time | 200 | 189 | 161 | 155 | 6 (4) | 28 (7) |
| 2nd Time | 220 | 218 | 196 | 190 | 6 (3) | 22 (7) |
| 3rd Time | 220 | 217 | 196 | 189 | 7 (5) | 21 (7) |
| Total | 640 | 624 | 553 | 534 | 19 (12) | 71 (21) |
| Trapping Rate (%) | | (Collection Rate: 97.5%) | 88.6 | 85.6 | 3.0 | |

In the experiment with respect to *Culex pipiens pallens* shown in Table 1, with respect to 625 test insects, the number of insects collected was 618 and a collection rate (100×the number of insects collected/the number of test insects) was 98.9%. The number of insects (the number of insects trapped) in the entire air blowing device 1 was 588, a breakdown of which was 559 found on the insect trapping sheet 51 and 29 (inclusive of 25 dead ones) found in a section other than on the insect trapping sheet 51. The number of insects found outside the air blowing device 1, inclusive of the number of insects in the rest box 100, was 30 (inclusive of 23 dead ones). A trapping rate of the entire air blowing device 1 was 95.1%, and a trapping rate of the insect trapping sheet 51 was 90.5%. These results indicate that the air blowing device 1 has extremely high insect trapping performance with respect to *Culex pipiens pallens*.

In the experiment with respect to *Culex pipiens molestus* shown in Table 2, with respect to 627 test insects, the number of insects collected was 625 and a collection rate was 99.7%. The number of insects (the number of insects trapped) in the entire air blowing device 1 was 615, a breakdown of which was 519 found on the insect trapping sheet 51 and 96 (inclusive of 54 dead ones) found in a section other than on the insect trapping sheet 51. The number of insects found outside the air blowing device 1, inclusive of the number of insects in the rest box 100, was 10 (inclusive of 2 dead ones). A trapping rate of the entire air blowing device 1 was 98.4%, and a trapping rate of the insect trapping sheet 51 was 83.0%. These results indicate that the air blowing device 1 has extremely high insect trapping performance with respect to *Culex pipiens molestus*.

In the experiment with respect to *Aedes albopictus* as shown in Table 3, respect to 640 test insects, the number of insects collected was 624 and a collection rate was 97.5%. The number of insects (the number of injects trapped) in the entire air blowing device 1 was 553, a breakdown of which was 534 found on the insect trapping sheet 51 and 19 (inclusive of 12 dead ones) found in a section other than on the insect trapping sheet 51. The number of insects found outside the air blowing device 1, inclusive of the number of insects in the rest box 100, was 71 (inclusive of 21 dead ones). A trapping rate of the entire air blowing device 1 was 88.6%, and a trapping rate of the insect trapping sheet 51 was 85.6%. These results indicate that the air blowing device 1 has extremely high insect trapping performance with respect to *Aedes albopictus*. After the experiment, 34 out of 71 found outside the air blowing device 1 flew toward an observer, which indicated that *Aedes albopictus* used in this experiment had high eagerness for blood sucking.

Table 4 shows results of an experiment of comparing an insect trapping effect between cases where the front surface of the housing 2 and the outer surface of the cover member 3 vary in color. In a test device A, similarly to the air blowing device 1 of this embodiment, the front surface of the housing 2 and the outer surfaces of the cover member 3 were formed in black. In a test device B, the front surface of the housing 2 was formed in black, and the outer surface of the cover member 3 was formed in white. In a test device C, the front surface of the housing 2 was formed in white, and the outer surface of the cover member 3 was formed in black. In a test device D, the front surface of the housing 2 and the outer surface of the cover member 3 were formed in white. Other components of the test devices A to D are configured similarly to those of the air blowing device 1.

The experiment was performed in a following manner. That is, test insects (*Culex pipiens pallens*) were released at a position 1 m away from the test devices A to D and left alone for two hours in a state where the air blower 10 and the attraction light source 21 were stopped from being driven. Results are indicated as "Good" in a case where an observer judged that the number of insects adhering to the insect trapping sheet 51 was high and thus an insect trapping effect obtained was high and as "Poor" in a case where the observer judged that the number of insects adhering to the insect trapping sheet 51 was low and thus an insect trapping effect obtained was low. Furthermore, the results are indicated as "Fair" in a case where the observer judged that an insect trapping effect obtained was at a level between "Good" and "Poor".

TABLE 4

| | Front Surface of Housing | Cover Member | Result |
|---|---|---|---|
| Test Device A | Black | Black | Good |
| Test Device B | Black | White | Fair |
| Test Device C | White | Black | Good |
| Test Device D | White | White | Poor |

According to Table 4, the test device D exhibited a low insect trapping effect. On the other hand, the test device A exhibited a high insect trapping effect. Furthermore, the test device C also exhibited a high insect trapping effect. The test device B exhibited an insect trapping effect higher than that of the test device D and lower than those of the test device A and the test device C. These results revealed that an insect trapping effect of the air blowing device 1 can be improved by forming the outer surface of the cover member 3 in black.

Table 5 shows results of an experiment of comparing an insect trapping effect with respect to *Aedes aegypti* between cases where the housing 2 and the outer surface of the cover member 3 of the air blowing device 1 vary in color. *Aedes aegypti* is known as mosquitoes of a type that transmits viral infections diseases such as yellow fever and dengue fever. This experiment used a test device E in which, similarly to the air blowing device 1 of this embodiment, the front surface of the housing 2, the back surface of the housing 2, and the outer surface of the cover member 3 were formed in black. Furthermore, there was also used a test device F in which the front surface and the back surface of the housing 2 were formed in white. Furthermore, in the test device F, only a portion of the outer surface of the cover member 3 in a vicinity of the suction ports 4 was formed in black, and a remaining portion of the outer surface of the cover member 3 other than the vicinity of the suction ports 4 was formed in white. Other components of the test device F are configured similarly to those in the test device E.

Figure 9:
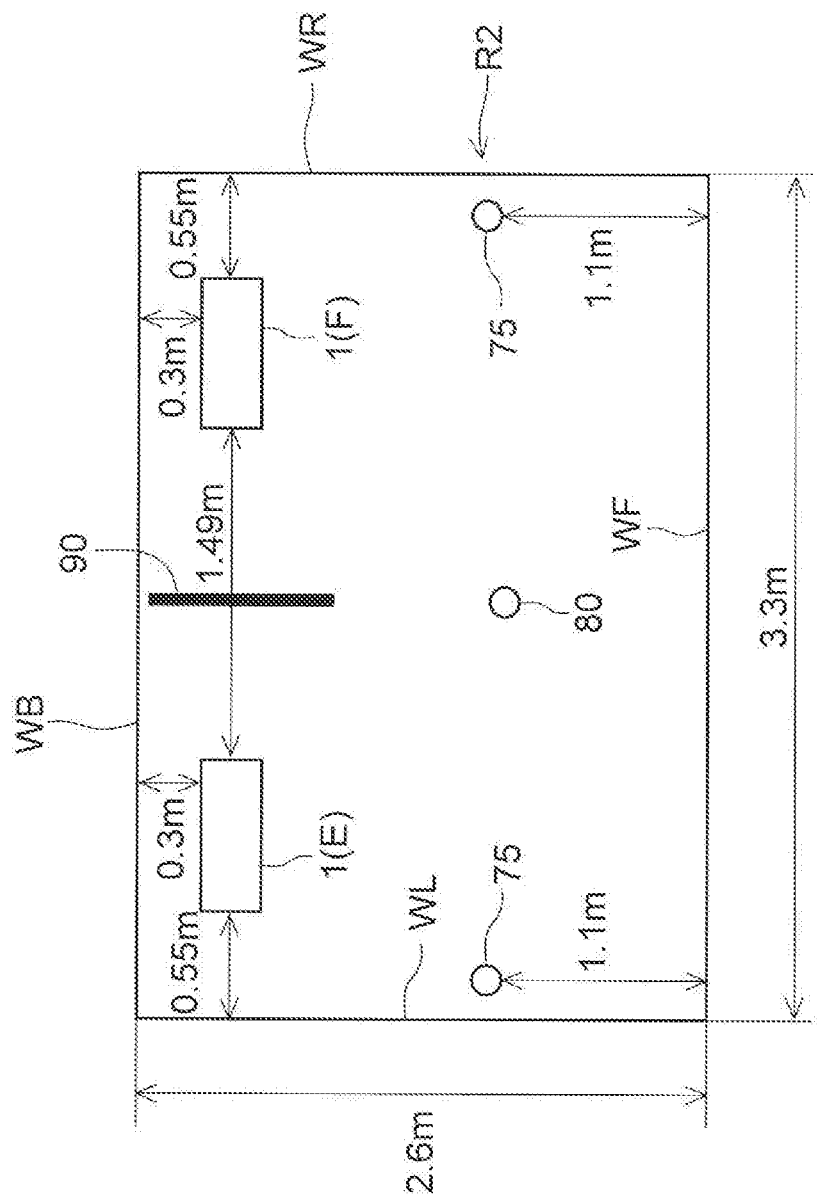
FIG. 9 is a plan view for explaining an experiment for examining an influence, upon a trapping rate with respect to *Aedes aegypti*, of a color of the cover member of the air blowing device of the first embodiment of the present invention.

FIG. 9 is a view showing a layout in a test room R2 in which this experiment was implemented. In the test room R2 that was 3.3 m in length in a width direction, 2.6 m in length in a depth direction, and 3.0 m in length in a height direction, a partition 90 was disposed in a middle portion thereof in the width direction. The test device E was disposed on a left side with respect to the partition 90, and the test device F was disposed on a right side with respect to the partition 90. The test devices E and F were 0.55 m away from a left side wall WL and a right side wall WR, respectively, and 0.3 m away from a back side wall WB. Furthermore, a distance between the test device E and the test device F was set to 1.49 m.

In each of the test devices E and F, an appropriate amount of adhesive was applied to the pre-filter 8 by using a spray adhesive. Furthermore, the insect trapping sheet 51 was arranged also on a bottom surface in the insect trapping space 25.

In a vicinity of each of the left side wall WL and the right side wall WR in the test room R2, a cup 75 was disposed 1.1 m away from a front side wall WF. A piece of absorbent cotton impregnated with a bait for mosquitoes (sugar, vitamin B1: a 10% sugar solution having a vitamin B1 content of 1%) was put in the cup 75. Furthermore, in a center portion in the test room R2, a cage 80 containing test insects was disposed. As the test insects, female imagoes *Aedes aegypti* were used.

The experiment was started by opening the cage 80 to release the test insects into the test room R2. After a lapse of 24 hours (an experiment time) following the release of the test insects, the number of insects trapped by the pre-filter 8 of each of the test devices E and F, the number of insects trapped by the insect trapping sheet 51 on the cover member 3, the number of insects trapped by a bottom portion in the insect trapping space 25, the number of insects in any other section than in each of the test devices E and F in the test room R2, and the number of dead insects were counted. A trapping rate (%) was calculated in a similar manner to that in cases of Tables 1 to 3.

During the experiment time, the attraction light source 21 of each of the test devices E and F was lit, and the air blower 10 was driven at the air blowing level "Medium." Furthermore, a floor surface in the test device R2 was maintained at a temperature not lower than 26° C. After a lapse of the experiment time, the air blower 10 and the attraction light source 21 were stopped from operating.

TABLE 5

| | | Number of *Aedes aegypti* Trapped | | | |
|---|---|---|---|---|---|
| | Trapping Rate (%) | Entire Device | On Pre-filter | Insect Trapping Sheet on Cover Member | Insect Trapping Sheet in Bottom Portion |
| Test Device E | 72.4 | 178 | 119 | 32 | 27 |
| Test Device F | 25.6 | 63 | 38 | 12 | 13 |

With respect to 246 test insects, the number of insect collected was 246, and a collection rate was 100%. The number of insects trapped by the pre-filter 8, the number of insects trapped by the insect trapping sheet 51 on the cover member 3, and the number of insects trapped by the bottom portion in the insect trapping space 25 (the numbers of insects trapped) in the test device E were 119, 32, and 27, respectively, while in the test device F, these numbers were 38, 12, and 13, respectively. The number of insects trapped in the entire test device E (the number of insects trapped) was 178, and a trapping rate was 72.4%. On the other hand, the number of insects trapped in the entire test device F was 63, and a trapping rate was 25.6%. In each of the test devices E and F, the number of insects in any other section than in the each of the test devices E and F in the test room R2 was 5, and the number of dead insects was 0.

These results indicate that in a case where the front surface of the housing 2, the back surface of the housing 2, and the outer surface of the cover member 3 of the air blowing device 1 are formed in black, the air blowing device 1 has high insect trapping performance also with respect to *Aedes aegypti*.

In this experiment with respect to *Aedes aegypti*, unlike the experiment results shown in Tables 1 to 3, the number of insects on the insect trapping sheet 51 on the cover member 3 of each of the test devices E and F (the number of insects trapped) was smaller than the number of insects in any other section than on the insect trapping sheet 51 in the each of the test devices E and F. Presumably, this is because, in this experiment, the spray adhesive was applied to the pre-filter 8, and the insect trapping sheet 51 was arranged in the bottom portion in the insect trapping space 25, so that the number of insects trapped by the pre-filter 8 and the number of insects trapped by the bottom portion in the insect trapping space 25 were increased.

Figure 10:
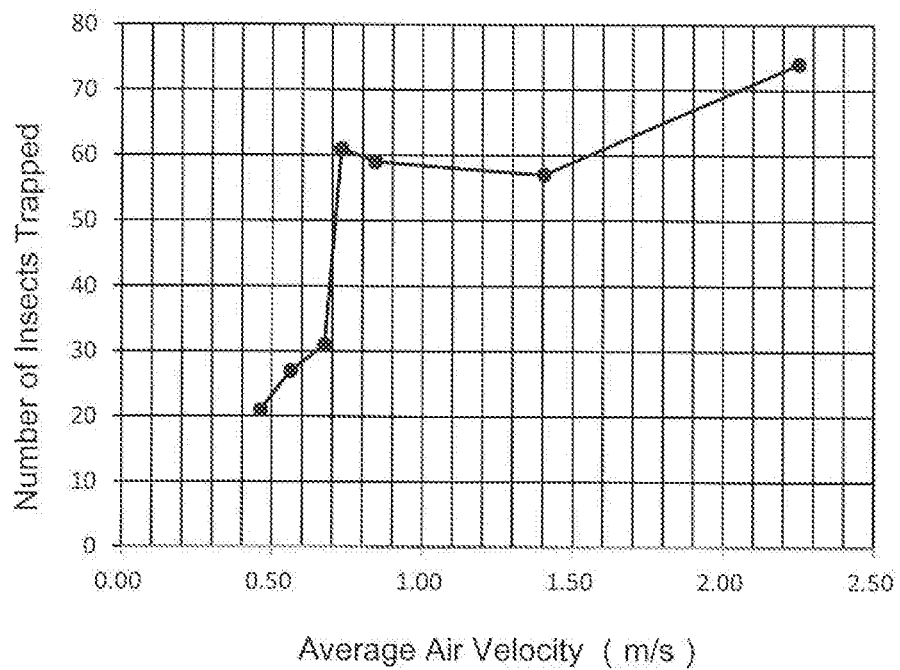
FIG. 10 is a view showing a relationship between the number of insects trapped by the insect trapping sheet and an air velocity at a suction port in the air blowing device of the first embodiment of the present invention.

Next, FIG. 10 is a view showing results of examining a relationship between an air velocity at the suction ports 4 and the number of insects trapped by the insect trapping sheet 51 (the number of insects trapped). A vertical axis represents the number of insects trapped, and a horizontal axis represents an average air velocity (unit: m/s) at the suction ports 4. In experiments performed, test insects (*Culex pipiens pallens*) were released at a position 1 m away from the air blowing device 1, and the air blowing device 1 was driven for 16 hours, with the air blower 10 made to vary in rotational speed. In each of the experiments, 100 test insects were used. After that, the number of insects trapped by the insect trapping sheet 51 (the number of insects trapped) was counted. An average air velocity V (m/s) at the suction ports 4 was calculated using Expression (2), where an opening area of the suction ports 4 was indicated as A (m²), and an air volume of the air blower 10 was indicated as Q (m³/s). Here, the opening area A of the suction ports 4 was set to be constant at 0.0297 m² (0.00297 m²×10 ports), which is a size of the opening area of the suction ports 4 formed in this embodiment, and the average air velocity V was made to vary by changing the air volume Q.

$$V=Q/A \qquad (2)$$

According to FIG. 10, when the average air velocity at the suction ports 4 was lower than 0.7 m/s, the number of insects trapped was not more than 31. Furthermore, when the average air velocity V at the suction ports 4 exceeded 0.7 m/s (Q/A>0.7), insects escaping out of the insect trapping space 25 were decreased, and the number of insects trapped was increased to not less than 57. Thus, by satisfying Q/A>0.7, insect trapping performance can be improved.

According to this embodiment, the outer surface of the cover member 3 forming the insect trapping space 25 between the suction ports 4 and the inflow port 20 is formed in black. Thus, insects can be easily attracted to a vicinity of the cover member 3, and the insects easily enter the insect trapping space 25. Accordingly, insect trapping performance of the air blowing device can be safely improved.

Furthermore, a region of the housing 2, which faces the insect trapping space 25, is formed in black, and thus insects in a vicinity of the suction ports 4 of the cover member 3 are easily attracted to the insect trapping space 25 via the suction ports 4.

Furthermore, the insect trapping sheet 51 is disposed on the inner surface of the cover member 3 so as to be opposed to the pre-filter 8. Thus, when an insect that has entered through the suction ports 4 is carried by a sucked-in airflow toward the inflow port 20, the insect is trapped by the insect trapping sheet 51 opposed to the inflow port 20. Thus, clogging of the pre-filter 8 with insects can be reduced.

Furthermore, the insect trapping sheet 51 is formed in black, and thus insects in the insect trapping space 25 can be easily attracted to the insect trapping sheet 51. Accordingly, insect trapping performance of the air blowing device 1 can be further improved.

Furthermore, the insect trapping sheet 51 is arranged to extend between the upper portion and the lower portion of the insect trapping space 25, the inflow port 20 is disposed to face the lower portion of the insect trapping space 25, and the attraction light source 21 is disposed to face the upper portion of the insect trapping space 25. This makes it easier for an insect being attracted to the attraction light source 21 to enter the insect trapping space 25 through upper ones of the suction ports 4. An insect carried by a sucked-in airflow toward the inflow port 20 facing the lower portion of the insect trapping space 25 is likely to be trapped at a lower portion of the insect trapping sheet 51. With this in view, a quantity of insects trapped at an upper portion of the insect trapping sheet 51 is increased by operating the attraction light source 21, and thus insects can be uniformly trapped over the entire insect trapping sheet 51. Accordingly, a frequency of replacing the insect trapping sheet 51 is reduced, and thus convenience can be improved.

Furthermore, the insect trapping sheet 51 is projected in the axial direction of the motor 10a so as to cover the motor 10a in its entirety. Thus, an airflow sucked into the inflow port 20 by the air blower 10 can be made to circulate in a wide range along the insect trapping sheet 51. This makes it likely that an insect carried by a sucked-in airflow comes in contact with the insect trapping sheet 51, thus a quantity of insects trapped by the insect trapping sheet 51 can be increased.

Furthermore, when Q/A>0.7 is satisfied, insects escaping out of the insect trapping space 25 are decreased, and thus the number of insects trapped by the insect trapping sheet 51 can be increased. Accordingly, insect trapping performance of the air blowing device 1 can be further improved. At this time, when Q/A is set to have a value in a vicinity of 0.7, while improving insect trapping performance, an increase in noise level of the air blowing device 1 can be suppressed.

While in this embodiment, the front surface of the housing 2, the back surface of the housing 2, the outer surface of the cover member 3, the insect trapping sheet 51, and the mounting plate 55 are formed in black, these are only required to be in a dark color and thus may be formed in, for example, navy blue or dark brown. Also in such a case, insects can be easily attracted to the insect trapping space 25 and the insect trapping sheet 51.

Furthermore, a configuration may also be adopted in which the outer surface of the cover member 3 is formed in a dark color, and the front surface of the housing 2 and other portions are formed in a color different from the color of the outer surface of the cover member 3. For example, as shown in the previously mentioned test device C in Table 4, the front surface of the housing 2 may be formed in a bright color such as white. Furthermore, the front surface of the housing 2 may be formed in a dark color (for example, mazarine) having lightness higher than that of the color (for example, black) of the outer surface of the cover member 3. In this case, insects can be attracted to the outer surface of the cover member 3 and the front surface of the housing 2, and insects attracted to the front surface of the housing 2 are attracted to the outer surface of the cover member 3, which has lightness lower than that of the front surface of the housing 2. Accordingly, insect trapping performance of the air blowing device 1 can be further improved.

Furthermore, while in this embodiment, the cover member 3 is arranged behind the housing 2, a configuration may also be adopted in which the inflow port 20 is disposed in the front surface of the housing 2, and the cover member 3 is arranged in front of the housing 2.

Furthermore, while in this embodiment, the plurality of insect trapping sheets 51 are stacked on the mounting plate 55, instead, the mounting plate 55 with a single insect trapping sheet 51 arranged thereon may be mounted to the cover member 3. In this case, the insect trapping sheet 51 after use, to which insects have adhered, is replaced together with the mounting plate 55.

Furthermore, in this embodiment, the insect trapping sheet 51 may be omitted. In a state where the air blower 10 is driven, due to a suction force of the air blower 10, an insect that has entered the insect trapping space 25 can hardly escape out of the insect trapping space 25. Thus, even when the insect trapping sheet 51 is omitted, the air blowing device 1 can trap insects in the insect trapping space 25.

Second Embodiment

Next, a description is given of a second, embodiment of the present invention. This embodiment is different from the first embodiment in that an insect killing sheet is provided in place of the insect trapping sheet 51. Other portions are configured similarly to those in the first embodiment.

In place of the insect trapping sheet 51, the insect killing sheet (not shown) is mounted to the mounting plate 55. The insect killing sheet is formed of, for example, a base material sheet (not shown) with a volatile insecticide applied thereto. Thus, an insect killing component is diffused in air in the insect trapping space 25 (see FIG. 2) and thus kills insects therein, so that the insects can be trapped and stored in the insect trapping space 25. At this time, preferably, a demountable tray or the like is provided in the lower portion of the insect trapping space 25 so that insects that have been killed and fallen in the insect trapping space 25 can be collected and easily discarded.

Third Embodiment

Next, a description is given of a third embodiment of the present invention. This embodiment is different from the first embodiment in that a spray portion is provided in place of the insect trapping sheet 51. Other portions are configured similarly to those in the first embodiment.

The spray portion (not shown) is provided in an upper portion on the inner side of the cover member 3. The spray portion has a tank (not shown) filled with an insecticide and sprays the insecticide into the insect trapping space 25 (see FIG. 2). Thus, insects in the insect trapping space 25 are killed, so that the insects can be trapped and stored in the insect trapping space 25. The spray portion may spray the insecticide, for example, after a lapse of a predetermined time following a start of an operation of the air blowing device 1. Also, the insecticide may be sprayed by operating the operation portion 6. It is only required that the spray portion 60 be able to spray an insecticide into the insect trapping space 25, and thus the spray portion 60 may also be provided in the housing 2 instead of in the cover member 3.

Fourth Embodiment

Next, a description is given of a fourth embodiment of the present invention. This embodiment is different from the first embodiment in that an electric shock insect killing portion is provided in place of the insect trapping sheet 51. Other portions are configured similarly to those in the first embodiment.

The electric shock insect killing portion (not shown) is provided on the inner surface of the cover member 3. The electric shock insect killing portion generates a high voltage and kills an insect that has come in contact therewith by shocking it with the high voltage. Thus, without using a chemical agent such as an insecticide, insects that have entered the insect trapping space 25 can be trapped and stored in the insect trapping space 25. The electric shock insect killing portion may be provided in the housing 2 instead of in the cover member 3.

In the first embodiment to the fourth embodiment, the attraction light source 21 may be omitted from the air blowing device 1. Furthermore, while the first embodiment to the fourth embodiment have been described by using, as an example, the air blowing device 1 provided with the HEPA filter 9 and the ion generator 11, a configuration may also be adopted in which the HEPA filter 9 and the ion generator 11 are omitted, and a circulator that blows off air through the blow-off port 5 and thus circulates air in a room is used to trap insects.

INDUSTRIAL APPLICABILITY

The present invention is usable in an air blowing device that traps insects that have entered an insect trapping space between a housing and a cover member.

LIST OF REFERENCE SYMBOLS 1 air blowing device
2 housing
3 cover member
4 suction port
5 blow-off port
6 operation portion
7 air blowing passage
8 pre-filter
9 HEPA filter
10 air blower
11 ion generator
20 inflow port
21 attraction light source
51 insect trapping sheet
52 base material sheet
53 adhesive
55 mounting plate
61 reflection portion
61a reflection surface

The invention claimed is:

1. An air blowing device, comprising:
a housing that has openings as an air inflow port and an air blow-off port;
an air blower that is arranged in the housing;
a filter that is arranged at the inflow port and collects dust in air;
a cover member that has an opening as an air suction port, is mounted to the housing, and forms an insect trapping space between the suction port and the inflow port, and
an insect trapping sheet,
the air blowing device being configured to trap insects that have entered the insect trapping space via the suction port,
wherein
an outer surface of the cover member is formed in a dark color,
the cover member is formed so as to be mountable/demountable to/from the housing,
the insect trapping sheet is formed of a base material sheet with an adhesive applied on one surface thereof, and
the insect trapping sheet is disposed on an inner surface of the cover member so as to be opposed to the filter.

2. The air blowing device according to claim 1, further comprising:
an attraction light source that is arranged in a concave portion provided on a back surface of the housing and that emits light for attracting insects to the insect trapping space,
wherein
the insect trapping sheet is arranged to extend between an upper portion and a lower portion of the insect trapping space,
the inflow port is disposed to face the lower portion of the insect trapping space, and
the attraction light source is disposed to face the upper portion of the insect trapping space.

3. The air blowing device according to claim 1, wherein an impeller that is mounted to a rotary shaft of a motor of the air blower is arranged to face the inflow port, and the insect trapping sheet is projected in an axial direction of the motor so as to cover the motor in its entirety.

4. The air blowing device according to claim 1, wherein when an opening area of the suction port is indicated as $A$ m$^2$ and an air volume of the air blower is indicated as $Q$ m$^3$/s, $Q/A > 0.7$ is satisfied.

5. An insect trapping method for an air blowing device, the air blowing device including:
- a housing that has openings as an air inflow port and an air blow-off port;
- an air blower that is arranged in the housing;
- a filter that is arranged at the inflow port and collects dust in air;
- a cover member that has an opening as an air suction port, is mounted to the housing, and forms an insect trapping space between the suction port and the inflow port; and
- an insect trapping sheet, the method comprising driving the air blower to trap insects that have entered the insect trapping space via the suction port, wherein an outer surface of the cover member is formed in a dark color, the cover member is formed so as to be mountable/demountable to/from the housing, the insect trapping sheet is formed of a base material sheet with an adhesive applied on one surface thereof, and the insect trapping sheet is disposed on an inner surface of the cover member so as to be opposed to the filter.

* * * * *